United States Patent [19]
Baumann et al.

[11] 4,038,338
[45] July 26, 1977

[54] NEW POLYEPOXIDE-POLYSILOXANE COMPOUNDS

[75] Inventors: Dieter Baumann, Birsfelden; Heinz Rembold, Arlesheim; Rolf Schmid, Gelterkinden; Friedrich Lohse, Oberwil, all of Switzerland

[73] Assignee: Ciba-Geigy Corporation, Ardsley, N.Y.

[21] Appl. No.: 556,073

[22] Filed: Mar. 6, 1975

Related U.S. Application Data

[63] Continuation of Ser. No. 299,537, Oct. 20, 1972, abandoned.

[30] Foreign Application Priority Data

Oct. 25, 1971 Switzerland .................. 15486/71

[51] Int. Cl.$^2$ ........................................... C08L 83/10
[52] U.S. Cl. ........................ 260/824 EP; 260/37 EP; 260/37 SB; 260/40 R; 260/827; 260/835
[58] Field of Search ................................ 260/824 EP

[56] References Cited

U.S. PATENT DOCUMENTS

| | | | |
|---|---|---|---|
| 2,687,398 | 8/1954 | McLean | 260/824 EP |
| 2,864,722 | 12/1958 | Millar et al. | 260/824 EP |
| 3,170,890 | 2/1965 | Boyd et al. | 260/824 EP |
| 3,324,080 | 6/1967 | Hicks | 260/46.5 Y |
| 3,529,034 | 9/1970 | Groff | 260/824 EP |
| 3,576,903 | 4/1971 | Groff | 260/824 EP |
| 3,779,988 | 12/1973 | Rembold et al. | 260/824 EP |

FOREIGN PATENT DOCUMENTS

| | | |
|---|---|---|
| 559,238 | 6/1958 | Canada |
| 662,941 | 5/1963 | Canada |
| 4,538,428 | 12/1970 | Japan |
| 385,492 | 3/1965 | Switzerland |

*Primary Examiner*—Paul Lieberman
*Attorney, Agent, or Firm*—Vincent J. Cavalieri

[57] ABSTRACT

New polyepoxide-polysiloxanes, which are obtained by mixing in appropriately stoichiometric amounts, an adduct manufactured from a polyepoxide and an acid polyester or a polycarboxylic acid with a polysiloxane and esterifying the mixture, are described.

The new compounds can be cured with conventional epoxide resin curing agents, especially cycloaliphatic polycarboxylic acid anhydrides, to give flexible to rubbery-elastic mouldings, which show very low water absorption coupled with excellent dielectric properties and high tracking resistance and arcing resistance.

10 Claims, No Drawings

NEW POLYEPOXIDE-POLYSILOXANE COMPOUNDS

This is a continuation of application Ser. No. 299,537, filed on Oct. 20, 1972, which application is now abandoned.

It is known to use cycloaliphatic polyepoxide resins for the manufacture of arcing-resistant and tracking-resistant moulded materials, with cycloaliphatic or halogenated polycarboxylic acid anhydrides being used appropriately as epoxide resin curing agents. The moulded materials obtained in this manner additionally possess high heat distortion points, and good mechanical and dielectric properties in the hard elastic state. For example, cycloaliphatic polyepoxides of the following structure:

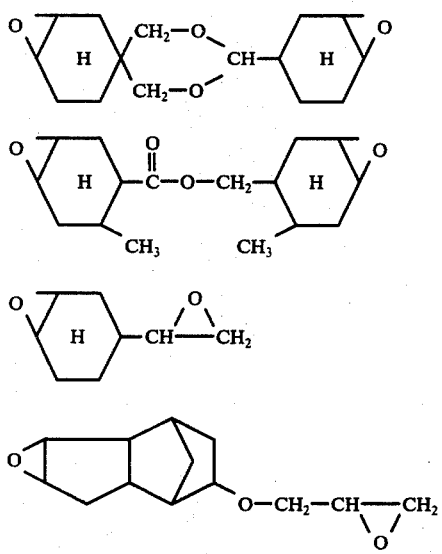

have proved particularly valuable.

As compared to the epoxide resins of the conventional type, manufactured from bisphenol A and epichlorohydrin, the use of the cycloaliphatic epoxide resins yields relatively brittle moulded materials of high density of crosslinking, with a relatively high modulus of elasticity and a low elongation at break of only about 1 – 2 percent.

It was therefore desirable, for numerous practical applications, to plasticise the cycloaliphatic epoxide resins. Numerous attempts relating to this problem are known from the literature. A great disadvantage has proved to be that the water absorption of the moulded materials increases with increasing plasticisation of the cycloaliphatic epoxide resins; for the unmodified cycloaliphatic epoxide resins cured with hexahydrophthalic anhydride, the water absorption is already of the order of magnitude of 0.5 – 1%, whilst, by way of comparison, in the case of epoxide resins based on bisphenol A and epichlorohydrin, using the same curing agent, a water absorption which does not exceed a value of 0.4% is measured.

If now, for example, 30 parts of polypropylene glycol of molecular weight 1,025 are added as plasticiser to 3-(3', 4'-epoxycyclohexyl)-9,10-epoxy-2,4-dioxaspiro[5,5]undecane, the cured moulded material displays an increased flexibility; however, the water absorption rises to 0.7 – 1.0%, a value which renders various applications questionable. A further addition of plasticiser is for this reason not possible for applications where good dielectric properties after storage in water or storage in moisture are demanded.

The possibility of manufacturing flexible moulded materials based on cycloaliphatic epoxides by introducing more flexible intermediate members between two ring epoxide end groups has also not produced any significant improvement. If, for example, the cycloaliphatic diepoxide of the formula

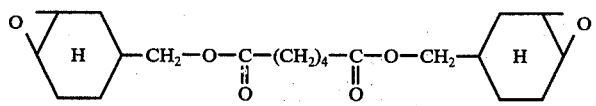

is cured, using hexahydrophthalic anhydride, mouldings which display a water absorption of at least 0.6 – 0.8% are obtained. If it is desired to manufacture flexible moulded materials of which the water absorption is still below the maximum value of 0.5% which is usuable for electrical applications, the approaches briefly described do not yield a useful result.

It has now been found that reaction of certain polysiloxane compounds with adducts of polyepoxides and acids or polyesters yields new polyepoxide compounds which, surprisingly, do not display the abovementioned disadvantages or only display them to a greatly reduced extent. The polyepoxide according to the invention can be cured with conventional epoxide resin curing agens, especially cycloaliphatic polycarboxylic anhydrides, to give flexible to rubbery-elastic moulded materials which display a very low water absorption coupled with excellent dielectric properties and high tracking resistance and arcing resistance. The high elongation at break of those moulded materials remains preserved over a wide temperature range.

The subject of the invention are new polyepoxide-polysiloxanes which are characterised in that they contain units of the formula I

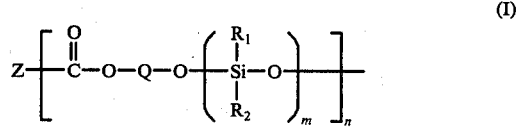

(I)

in which Z represents a n-valent radical of a polycarboxylic acid or of an acid polyester, Q represents an aliphatic, cycloaliphatic, heterocyclic or aromatic epoxide-containing group in which the two oxygen atoms bonded to Q in the formula I are located in adjacent positions to one another, and $R_1$ and $R_2$ independently of one another represent an alkyl, alkenyl, aralkyl, aryl, cycloalkyl, alkoxy or aryloxy group or an epoxide-containing polysiloxane chain, and $m$ represents a number greater than 1 and $n$ represents 2 or 3. Particularly suitable polyepoxide-polysiloxanes of the formula I are those in which $n$ denotes the number 2 and Z denotes the radical of a polyester of an aliphatic or cycloaliphatic dicarboxylic acid and of a diol, with aliphatic polyesters, especially those with at least 8 carbon atoms in the recurring structural element, and having a melting point of 50° C – 140° C, being preferred. To manufacture such polyesters, x+1 mols of a dicarboxylic acid are reacted with x mols of a diol, x denoting a number from 2 to 50. Further suitable polyesters are those with a dimerised fatty acid as the dicarboxylic acid component.

Preferred polyepoxide-polysiloxane compounds possess recurring units of the formula II

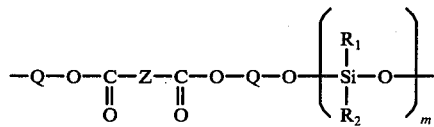

$R_1$ and $R_2$ preferably denote alkyl groups of alkoxy groups with 1 to 4 carbon atoms, aralkyl groups with 7 to 10 carbon atoms, phenyl groups, phenoxy groups or cyclohexyl groups and $m$ preferably represents 2 – 15, preferentially 6 – 15.

The new polyepoxide-polysilanes are manufactured by mixing, in appropriately stoichiometric amounts, an adduct, manufactured from a polyepoxide and an acid polyester or a polycarboxylic acid, of the formula III

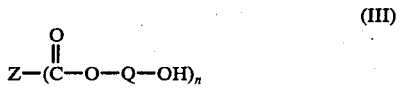

in which Q denotes an aliphatic, cycloaliphatic, heterocyclic or aromatic epoxide-containing group, with the hydroxyl group being in the adjacent position to the oxygen atom of the ester group, Z denotes a n-valent radical of the polycarboxylic acid or of an acid polyester and $n$ represents 2 or 3, with a polysiloxane of the formula IV

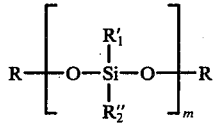

wherein R denotes a H-atom or an alkyl group with 1 to 4 carbon atoms, $R_1'$ and $R_2''$ independently of one another denote an alkyl, alkenyl, aralkyl, aryl, cycloalkyl, alkoxy or aryloxy group and $m$ denotes a number greater than 1, and esterifying or transesterifying the mixture at a temperature of 50°–200° C.

Preferably, starting compounds of the formula III in which $n$ denotes the number 2 are used, that is to say adducts of a polyepoxide and a dicarboxylic acid or a polyester with two terminal carboxyl groups, especially an aliphatic or cycloaliphatic dicarboxylic acid or a polyester of an aliphatic or cycloaliphatic dicarboxylic acid with an aliphatic diol.

Preferably, those polysiloxanes are used which do not possess more than 4 reactive hydrogen atoms and/or alkoxy groups per molecule and wherein, in the formula IV, $m$ denotes a number from 2 to 30, preferably 6 to 15, corresponding to a molecular weight of about 200 to about 2,000 or about 750 to about 2,000.

The reaction of the alkoxypolysiloxanes or hydroxypolysiloxanes with the adducts containing epoxide groups is carried out in accordance with known processes, by transesterification or esterification. For this, the two components are preferably mixed in approximately stoichiometric amounts and reacted, preferably in the presence of a catalyst. The amount of alcohol or water liberated during the transesterification is distilled off. During the reaction it is possible to use basic, acid and also neutral catalysts. As examples there may be mentioned: quaternary ammonium salts, titanium salts of organic acids, and aluminum halides and boron halides. The reaction is carried out at temperatures of 50° – 200° C, but preferably between 80° and 150° C.

The following compounds may be given as examples of the polysiloxanes to be used:

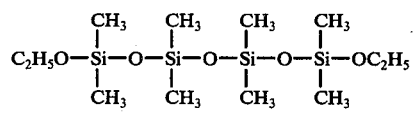

(=1,4-diethoxyoctamethyltetrasiloxane)

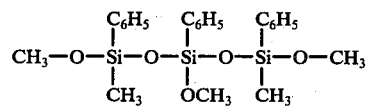

(=1,3-dimethyl-1,2,3-triphenyl-1,2,3-trimethoxy-trisiloxane, which is commercially available under the trade name "Sylkyd 50∞)

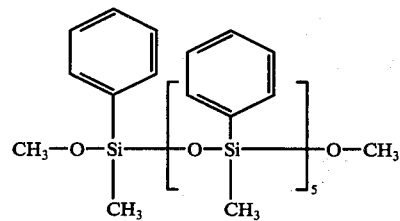

(=1,6-dimethoxyhexamethylhexaphenylhexasiloxane).

It is also possible to use commercially obtainable technical mixtures of polysiloxanes which contain at least 2 reactive alkoxy and/or hydroxyl groups per molecule and which correspond to the general formula IV given above. It is also possible to use mixtures of straight-chain and branched-chain polysiloxanes. The average molecular weight of this mixture should preferably again lie in the range of 200 to 5,000, preferably 750 to 2,000, and the proportion of reactive hydroxyl groups or alkoxy groups per average molecule should not exceed an amount of 15 or 20 percent by weight.

Numerous polyepoxides can be used for the manufacture of the adducts of the formula III. Attention may be drawn, for example, to Belgian Patent Specification No. 737,151. In particular, polyepoxides with a cycloaliphatic group can also be used. Polyepoxides with at least one epoxide group present in an alicyclic five-membered or six-membered ring are particularly suitable.

The following may be mentioned as cycloaliphatic polyepoxide compounds with at least one six-membered ring to which a 1,2-epoxide group is bonded: limonene dioxide, vinylcyclo-hexene dioxide, cyclohexadiene dioxide; bis(3,4-epoxycyclohexyl)-dimethyl-methane; epoxycyclohexylmethyl ethers of glycols or hydroxyalkyleneglycols, such as diethylene glycol-bis(3,4-epoxy-6-methylcyclohexylmethyl)-ether; ethylene glycol-bis(3,4-epoxycyclohexylmethyl)-ether, 1,4-butanediol-bis(3',4'-epoxycyclohexylmethyl)-ether; (3,4-epoxycyclohexylmethyl)-glycidyl ether; (3,4-epoxycyclohexyl)-glycidyl ether, ethylene glycol-bis(3,4-epoxycyclohexyl)-ether, 1,4-butanediol-bis(3',4'-epoxycyclohexyl)-ether, p-hydroxylphenyldimethylmethane-bis-(3,4-epoxycyclohexyl)-ether; bis(3,4-epoxycyclohexyl)-ether; (3',4'-epoxycyclohexylmethyl)-3,4-epoxycyclohexyl-ether; 3,4-epoxycyclohexane-1,1-dimethanol-diglycidyl-ether.

Epoxycyclohexane-1,2-dicarboximides, such as N,N'-ethylenediamine-bis(4,5-epoxycyclohexane-1,2-dicarboximide); epoxycyclohexylmethyl-carbamates, such as bis(3,4-epoxycyclohexylmethyl)-1,3-toluylene-dicarbamate; epoxycyclohexane-carboxylates of aliphatic polyols, such as 3-methyl-1,5-pentanediol-bis(3,4-epoxycyclohexane-carboxylate), 1,5-pentanediol-bis(3,4-epoxycyclohexane-carboxylate), ethylene glycol-bis(3,4-epoxycyclohexane-carboxylate), 2,2-diethyl-1,3-propanediol-bis(3,4-epoxycyclohexane-carboxylate), 1,6-hexanediol-bis(3,4-epoxycyclohexane-carboxylate), 2-butene-1,4-diol-bis(3,4-epoxycyclohexane-carboxylate), 2-butene-1,4-diol-bis(3,4-epoxy-6-methylcyclohexane-carboxylate), 1,1,1-trimethylolpropane-tris(3,4-epoxy-cyclohexane-carboxylate), 1,2,3-propanetriol-tris(3',4'-epoxy-cyclohexane-carboxylate); epoxycyclohexane-carboxylates or oxyalkylene glycols, such as diethylene glycol-bis(3,4-epoxy-6-methylcyclohexane-carboxylate), triethylene glycol-bis(3,4-epoxycyclohexane-carboxylate); epoxycyclohexylalkyl-dicarboxylic acid esters, such as bis(3,4-epoxycyclohexylmethyl)-maleate, bis(3,4-epoxycyclohexylmethyl)-oxalate, bis(3,4-epoxy-cyclohexylmethyl)-pimelate, bis(3,4-epoxy-6-methylcyclohexylmethyl)-succinate, bis(3,4-epoxy-6-methylcyclohexylmethyl)-adipate, bis(3,4-epoxy-6-methylcyclohexylmethyl)-sebacate, bis(3,4-epoxycyclohexylmethyl)-terephthalate, bis(3,4-epoxy-6-methylcyclohexylmethyl)-terephthalate; epoxycyclohexyl-carboxylic acid esters, such as bis(3,4-epoxycyclohexyl)-succinate, bis(3,4-epoxycyclohexyl)-adipate, bis(3,4-epoxycyclohexyl)-carbonate, (3,4-epoxycyclohexyl)-3,4-epoxycyclohexanecarboxylate, 3,4-epoxycyclohexylmethyl-9,10-epoxystearate; 2',2''-sulphonyldiethanol-bis(3,4-epoxycyclohexanecarboxylate); bis(3,4-epoxycyclohexylmethyl)-carbonate, bis(3,4-epoxy-6-methylcyclohexylmethyl)-carbonate;

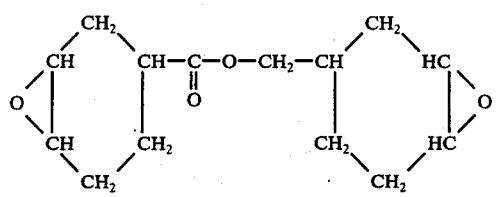

(=3',4'-epoxycyclohexylmethyl-3,4-epoxycyclohexanecarboxylate),

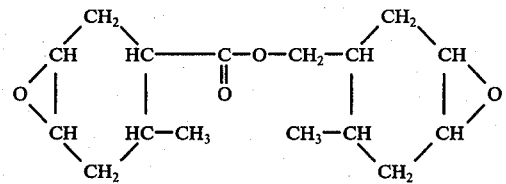

(=3',4'-epoxy-6'-methylcyclohexylmethyl-3,4-epoxy-6-methylcyclohexanecarboxylate); acetals and ketals with epoxycyclohexane groups, such as 3,4-epoxy-6-methylcyclohexanecarboxaldehyde-bis(3,4-epoxy-6-methylcyclohexylmethyl)-acetal; bis(3,4-epoxy-cyclohexylmethyl)formal, bis(3,4-epoxy-6-methyl-cyclohexylmethyl)-formal; benzaldehyde-bis(3,4-epoxycyclohexylmethyl)-acetal, acetaldehyde-bis(3,4-epoxycyclohexylmethyl)-acetal, acetone-bis(3,4-epoxycyclohexylmethyl)-ketal, glyoxal-tetrakis(3,4-epoxycyclohexylmethyl)-acetal; bis(3,4-epoxyhexanehydrobenzal)-D-sorbitol; bis(3,4-epoxyhexanehydrobenzal)-pentaerythritol (= 3,9-bis(3,4-epoxycyclohexyl)-spirobi-(metadioxane), bis(3,4-epoxy-6-methylhexahydrobenzaL)-pentaerythritol; 3-(3',4'-epoxycyclohexylmethyl-oxyethyl)-2,4-dioxaspiro(5.5)-8,9-epoxyundecane, 3-(3', 4'-epoxycyclohexylmethyloxy-(2')-propyl)-2,4-dioxaspiro(5.5)-8,9-epoxyundecane; 3,9-bis(3',4'-epoxycyclohexylmethyloxyethyl)-spirobi(m-dioxane); 3-(2',3'-epoxypropyloxyethyl-2,4-dioxaspiro(5.5)-8,9-epoxyundecane, 3-(glycidyloxyethoxyethyl)-2,4-dioxaspiro(5.5)-8,9-epoxy-undecane; ethylene glycol-bis-2'-(2,4-dioxaspiro(5.5)-8,9-epoxyundecyl-3)-ethyl-ether, polyethylene glycol-bis-2'-(2,4-dioxaspiro(5.5)-8,9-epoxy-undecyl-3)ethyl-ether, 1,4-butanediol-bis-2'-(2,4-dioxaspiro(5.5)-8,9-epoxyundecyl-3)-ethyl-ether, transquinitol-bis-2'-(2,4-dioxaspiro-(5.5)-8,9-epoxyundecyl-3-ethyl-ether, bis(2,4-dioxaspiro(5.5)-8,9-epoxyundecyl-3)-ether and 3,4-epoxyhexahydrobenzaldehyde-(1'-glycidyloxyglycerine-2',3')-acetal.

Particularly suitable compounds are, for example, those of the formulae

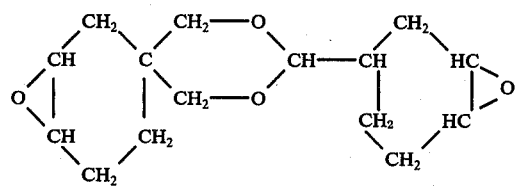

(3-(3',4'-epoxycyclohexyl)-8,9-epoxy-2,4-dioxaspiro(5,5)-undecane) and of the formula

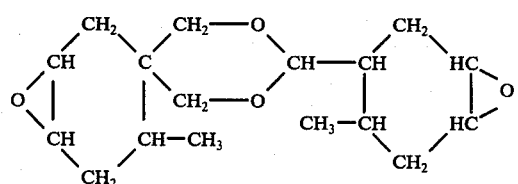

(3-(3',4'-epoxy-6'-methylcyclohexyl)-8,9-epoxy-11-methyl-2,4-dioxaspiro(5,5)-undecane).

As cycloaliphatic polyepoxide compounds with at least one five-membered ring to which a 1,2-epoxide group is bonded, there may be mentioned: dicyclopentadiene diepoxide, glycidyl-2,3-epoxycyclopentyl-ether, bis(cyclopentenyl)-ether diepoxide, 2,3-epoxybutyl-2,3-epoxycyclopentyl-ether, epoxypentyl-2,3-epoxycyclopentyl-ether, 9,10-epoxystearyl-2,3-cyclopentylether, 3,4-epoxycyclohexylmethyl-2,3-cyclopentylether, 2,2,5,5-tetramethyl-3,4-epoxycyclohexylmethyl-2,3-cyclopentylether, 2,2,5,5,6-pentamethyl-3,4-epoxycyclohexylmethyl-2,3-epoxycyclopentyl-ether; 2,3-epoxycyclopentyl-9,10-epoxystearate, 2,3-epoxycyclopentyl-3,4-epoxycyclohexylcarboxylate, 2,3-epoxycyclopentyl-2,2,5,5-tetramethyl-3,4-epoxycyclohexylcarboxylate; (3,4-epoxy-2,5-endomethylene-cyclohexylmethyl)-3,4-epoxy-2,5-endomethylene-cyclohexanecarboxylate, bis(3,4-epoxy-2,5-endomethylene-cyclohexylmethyl)-succinate; bis(3,4-epoxy-2,5-endomethylene-cyclohexylmethyl)-formal, bis(3,4-epoxy-2,5-endomethylene-hexahydrobenzal)-pentaerythritol, 3-(3',4'-epoxy-2',5'-endomethylenecyclohexylmethyl)-9,10-epoxy-2,4-dioxaspiro(5.5)-undecane; bis(3-oxatricyclo[3.2.1. 0$^{2,4}$]-oct-6-yl)-carbonate, bis(3-oxatricyclo[3.2.1.0$^{2,4}$]-oct-6-yl)-succinate, (3-oxatricyclo[3.2.1.0$^{2,4}$]-oct-6-yl)-3,4-epoxycyclohexylcarboxylate, (3-oxatricyclo[3.2.1.0$^{2,4}$]-oct-6-yl)-9,10-epoxyoctadecanoate; further, in particular, epoxidised ethers and esters of dihydrodicyclopentadien-8-ol, such as (4-oxatetracyclo[6.2.1.0$^{2,7}$0$^{3,5}$]hendec-9-yl)-glycidylether, (4-oxatetracyclo[6.2.1.0$^{2,7}$0$^{3,5}$]hendec-9-yl)-2,3-epoxybutyl-ether, (4-oxatetracyclo[6.2.1.0$^{2,7}$0$^{3,5}$]-hendec-9-yl)-6-methyl-3,4-epoxycyclohexylmethylether, (4-oxatetracyclo[6.2.1.0$^{2,7}$0$^{3,5}$]hendec-9-yl)-3,4-epoxycyclohexyl-ether, (4-oxatetracyclo[6.2.1.0$^{2,7}$0$^{3,5}$]-hendec-9-yl)-3-oxatricyclo(3.2.1.0$^{2,4}$)oct-6-yl-ether, (4-oxatetracyclo[6.2.1.0$^{2,7}$0$^{3,5}$]hendec-9-yl)3,4-epoxy-2,5-endomethylene-cyclohexylmethyl)-ether; ethylene glycol-bis(4-oxatetracyclo[6.2.1.0$^{2,7}$0$^{3,5}$]hendec-9-yl)-ether, diethylene glycol-bis(4-oxatetracyclo[6.2.1.0$^{2,7}$-0$^{3,5}$]hendec-9-yl)-ether, 1,3-propylene glycol-bis(4-oxatetracyclo[6.2.1.0$^{2,7}$0$^{3,5}$]hendec-9-yl)-ether, glycerine-bis(4-oxatetracyclo[6.2.1.0$^{2,7}$0$^{3,5}$]hendec-9-yl)-ether; bis(4-oxatetracyclo[6.2.1.0$^{2,7}$0$^{3,5}$]hendec-9-yl)-ether; bis(4-oxatetracyclo[6.2.1.0$^{2,7}$0$^{3,5}$]hendec-9-yl)-formal; bis(4-oxatetracyclo-[6.2.1.0$^{2,7}$0$^{3,5}$]hendec-9yl)-succinate; bis(4-oxatetracyclo-[6.2.1.0$^{2,7}$0$^{3,5}$]hendec-9-yl)-maleinate; bis(4-oxatetracyclo-[6.2.1.0$^{2,7}$0$^{3,5}$]hendec-9-yl)-phthalate; bis(4-oxatetracyclo-[6.2.1.0$^{2,7}$0$^{3,5}$]hendec-9-yl)-adipate; bis(4-oxatetracyclo-[6.2.1.0$^{2,7}$0$^{3,5}$]hendec-9-yl)-sebacate; tris(4-oxatetracyclo-[6.2.1.0$^{2,7}$0$^{3,5}$]hendec-9-yl)-trimellitate, 9,10-epoxy-octadecanoic acid [4-oxatetracyclo(6.2.1.0$^{2,7}$0$^{3,5}$]hendec-9-yl] ester and 9,10,12,13-diepoxyoctadecanoic acid (4-oxatetracyclo[6.2.1.0$^{2,7}$0$^{3,5}$]hendec-9-yl) ester.

As cycloaliphatic polyepoxide compounds which, though containing alicyclic ring systems, have the epoxide groups in alkyl side chains (above all as glycidyl groups, there may be mentioned: polyglycidyl esters of hydroaromatic polycarboxylic acids, for example Δ$^4$-tetrahydrophthalic acid diglycidyl ester, 4-methyl-Δ$^4$-tetrahydrophthalic acid diglycidyl ester, hexahydrophthalic acid diglycidyl ester, 4-methyl-hexahydrophthalic acid diglycidyl ester, also polyglycidyl-ethers of alicyclic alcohols such as, for example, the diglycidyl-ethers of 2,2-bis(4'-hydroxycyclohexyl)propane, 1,4-dihydroxycyclohexane (quinitol) or Δ$^3$-cyclohexene-1,1-dimethanol.

Possible polyepoxide compounds of the N-heterocyclic series are above all polyglycidyl compounds which contain a nitrogen-containing heterocyclic ring. One such compound is, for example, 1,3,5-tris-(62 -glycidyloxypropionyl)-hexahydro-s-triazine of the formula

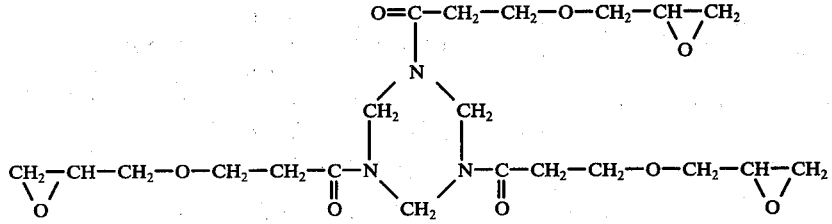

It is also possible to employ polyglycidol compounds of the N-heterocyclic series of which the heterocyclic ring contains at least one grouping

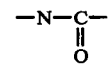

and where the glycidyl groups are directly bonded to endocyclic nitrogen atoms. Such polyepoxides are conveniently obtainable in accordance with known methods by reaction of epichlorohydrin with heterocyclic urea derivatives such as, in particular, cyanuric acid, ethyleneurea, hydantoin, substituted hydantoins, bis(-hydantoin) compounds, uracil, substituted uracils or bis(dihydrouracil) compounds, in the presence of suitable catalysts, for example tertiary amines.

The following may be mentioned: the triglycidylisocyanurate of the formula

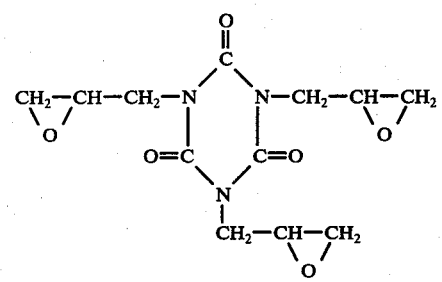

N,N'-diglycidyl-parabanic acid; N,N'-diglycidyl compounds of the formula

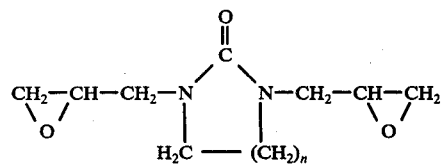

wherein $n = 1$, or 2, that is to say N,N'-diglycidylpropyleneurea and above all N,N'-diglycidylethyleneurea (=1,3-diglycidylimidazolidone-2); N,N'-diglycidyl compounds of the formula

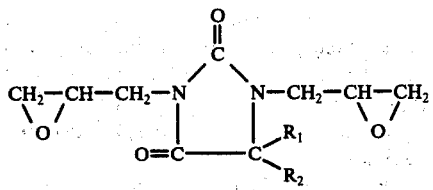

wherein $R_1$ and $R_2$ each denote a hydrogen atom or a lower alkyl radical with 1 to 4 carbon atoms, or wherein $R_1$ and $R_2$ together form a tetramethylene or pentamethylene radical; examples of this class of compound are, for example, 1,3-diglycidyl-hydantoin, 1,3-diglycidyl-5-methyl-hydantoin, 1,3-diglycidyl-5-n-propyl-hydantoin, 1,3-diglycidyl-5-methyl-5-ethyl-hydantoin, 1,3-diglycidyl-parabanic acid, 1,3-diglycidyl-1,3-diazaspiro(4.5)-decane-2,4-dione, 1,3-diglycidyl-1,3-diazospiro(4.4)nonane-2,4-dione and especially 1,3-diglycidyl-5,5-dimethyl-hydantoin as well as 1,3-diglycidyl-5-isopropyl-hydantoin.

N,N'-Diglycidyl compounds of the formula

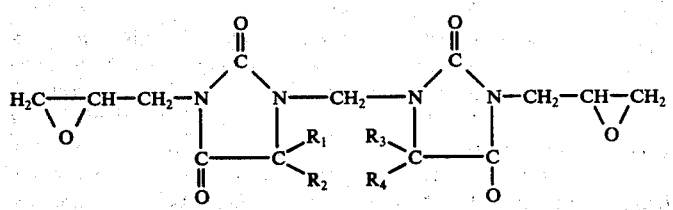

wherein $R_1$, $R_2$, $R_3$ and $R_4$ each denote a hydrogen atom or a lower alkyl radical with 1 to 4 carbon atoms, or wherein $R_1$ and $R_2$, and/or $R_3$ and $R_4$, together form a tetramethylene or pentamethylene radial; examples of this class of compound are, for example, bis(3-glycidyl-5,5-dimethyl-hydantoinyl-1)-methane, bis(3-glycidyl-5-methyl-5-ethyl-hydantoinyl-1)-methane and bis(3-glycidyl-5-propyl-hydantoinyl-1)-methane.

N,N'-Diglycidyl compounds of the formual

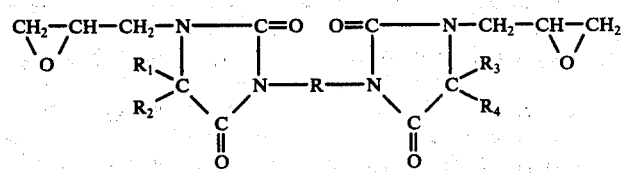

wherein R is an aliphatic, cycloaliphatic or araliphatic radical and $R_1$, $R_2$, $R_3$ and $R_4$ each denote a hydrogen atom or a lower alkyl radical with 1 to 4 carbon atoms, or wherein $R_1$ and $R_2$, and/or $R_3$ and $R_4$, together form a tetramethylene or pentamethylene radical; examples of this class of compound are, for example, bis(1-glycidyl-5,5-dimethylhydantoinyl-3)-methane, 1,2-bis(1-glycidyl-5',5'-dimethylhydantoinyl-3')-ethane, 1,4-bis(1-glycidyl-5,5'-dimethylhydanoinyl-3')-butane, 1,6-bis(1-glycidyl-5,5'-dimethylhydantoinyl-3')-hexane, 1,12-bis(1-glycidyl-5',5'-dimethylhydantoinyl-3')-dodecane and $\beta,\beta'$-bis(1-glycidyl-5',5'-dimethylhydantoinyl-3')-diethyl-ether.

N,N'-Diglycidyl compounds of the formula

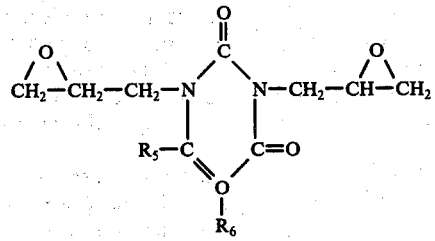

wherein $R_5$ and $R_6$ independently of one another each denote a hydrogen atom or a lower alkyl radical with 1 to 4 carbon atoms; examples of this class of compound are, for example, 1,3-diglycidyl-uracil, 1,3-diglycidyl-6-methyl-uracil and 1,3-diglycidyl-5-methyl-uracil.

N,N'-Diglycidyl compounds of the formula

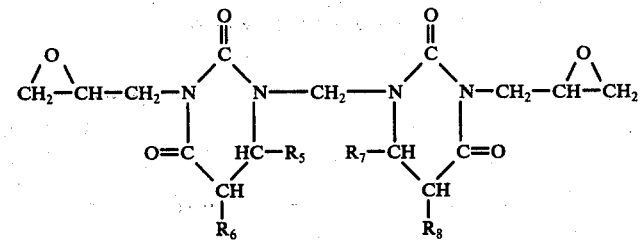

wherein $R_5$, $R_6$, $R_7$ and $R_8$ independently of one another each denote a hydrogen atom or a lower alkyl radical with 1 to 4 carbon atoms; examples of this class of compound are, for example, 3,3'-diglycidyl-1,1'-methylene-bis(5,6-dihydrouracil) and 3,3'-diglycidyl-1,1'-methylene-bis(6-methyl-5,6-dihydro-uracil).

However it is also possible to use the other known classes of polyepoxide compounds or epoxide resins for the manufacture of the curable mixtures according to the invention, for example di- or poly-glycidyl ethers of polyhydric phenols such as resorcinol, bis(p-hydroxyphenyl)methane, 2,2-bis-(p-hydroxyphenyl)propane (=bisphenol A), 2,2-bis(4'-hydroxy-3',5'-dibromophenyl)-propane, 1,1,2,2-tetrakis(p-hydroxylphenyl)-ethane or condensation products of phenols with formaldehyde obtained under acid conditions, such as phenol novolacs and cresol novolacs, polyglycidyl ethers of polyhydric alcohols, such as 1,4-butanediol and 1,6-hexanediol or polyalkylene glycol, for example polypropylene glycol or polybutylene glycol.

Polyglycidyl esters of polybasic carboxylic acids, such as adipic acid, trimethyladipic acid, phthalic acid, isophthalic acid, terephthalic acid, tetrachlorophthalic acid or trimellitic acid, or of polyesters with terminal carboxyl groups; N-glycidyl derivatives of aromatic amines, such as N,N-diglycidyl-aniline, N,N-diglycidyl-toluidine and N,N,N',N'-tetraglycidyl-bis(p-aminophenyl)methane.

The polyepoxides mentioned are reacted in a known manner with polycarboxylic acids, but preferably with polyesters with 2 to 3 terminal carboxyl groups, to give the adducts of the formula III, as a rule by melting the substances together in the requisite ratios so that, for example, 0.02 to 0.5, preferably 0.06 to 0.3, equivalent of carboxyl groups is provided per 1 equivalent of epoxide groups. The reaction is usually carried out at temperatures of between 100° and 200° C, preferably at between 130° and 180° C.

Preferably, the polyesters used are the esters of dicarboxylic acids, especially straight-chain aliphatic dicarboxylic acids and aliphatic diols, with polyesters which possess at least 8 carbon atoms in the recurring structural unit and have a melting point in the temperature range of about 50° to 140° C being particularly preferred.

The polyesters described in French Patent Specification 1,559,969 are also suitable, such as, for example, the acid polyesters which are obtainable by addition of (a+b) mols of a lactone to 1 mol of an aliphatic dicarboxylic acid in accordance with the equation

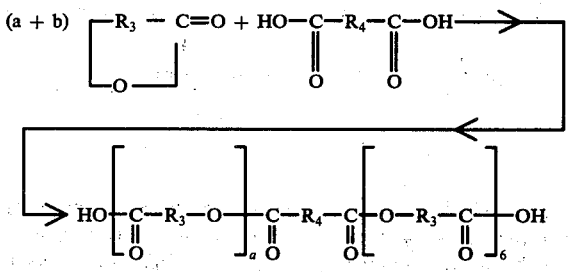

wherein $R_3$ denotes an alkylene chain with at least 4 and preferably at least 5 carbon atoms, $R_4$ represents an aliphatic hydrocarbon radical and the numbers a and b are so chosen that the product of $(a+b)$ and of the sum of (C atoms in $R_3$) is at least 50.

As aliphatic dicarboxylic acids there may be mentioned: adipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid and dodecenylsuccinic acid.

The following may be mentioned as aliphatic diols with at least 4 C atoms which can preferentially be used for the synthesis of the acid polyesters in question: 1,4-butanediol, 1,5-pentanediol, neopentyl-glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethylhexane and 1,6-dihydroxy-2,4,4-trimethylhexane.

When using a higher dicarboxylic acid such as adipic acid or sebacic acid for the synthesis of the acid polyester, it is also possible to use a lower aliphatic diol such as, for example, ethylene glycol or 1,3-propanediol. Conversely, when using a higher diol, such as 1,6-hexanediol or 1,10-decanediol, for the synthesis of the acid polyester, it is also possible to employ a lower aliphatic dicarboxylic acid, such as, for example, succinic acid or glutaric acid.

The polyepoxide-polysiloxanes according to the invention can be cured by means of epoxide curing agents ("curing agents") to give flexible, water-resistant mouldings.

Such curing agents can be basic or acid compounds.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylendediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,5-trimethyl-3-(aminomethyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)-methane, bis-(4-aminophenyl)-sulphone and m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethanepolyglycidyl-ethers; ketimines, for example from acetone or methyl ethyl ketone and bis(p-amino-phenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid ("VERSAMID"); polymeric polysulphides ("THIOKOL"); dicyandiamide, aniline-formaldehyde resins, polyhydric phenols, for example resorcinol, 2,2-bis-(4-hydroxyphenyl)-propane or phenol-formaldehyde resins; boron trifluoride ad boron trichloride and their complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, amelaic anhydride, sebacic anhydride, maleic anhydride, dodecenyl-succinic anhdyride; pyromellitic dianhydride, trimellitic anhydride or mixtures of such anhydrides.

Curing accelerators can furthermore be employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2- ethyl-4-methyl-imidazole, 4-amino-pyridine and triamylammonium phenolate, and also alkali metal alcoholates, such as, for example, sodium hexanetriolate. In the amine curing reaction, monophenols or polyphenols, such as phenol or diomethane, salicylic acid or thiocyanates, can for example be employed as accelerators.

The term "curing" as used here denotes the conversion of the abovementioned polyepoxides into insoluble and infusible, crosslinked products, and in particular, as a rule, with simultaneous shaping to give mouldings, such as castings, pressings or laminates and the like, or to give "sheet-like structures", such as coatings, coverings, lacquer films or adhesive bonds.

The flexibility of these moulded materials can also be modified at will by mixing the di- or poly-epoxide-polysiloxane compound according to the invention with other diepoxide and polyepoxide compounds. Here again cycloaliphatic diepoxide and/or polyepoxide compounds which contain ringepoxidised groups are used in order to obtain electrically high quality moulded materials which are resistant to tracking.

Depending on the choice of the curing agent, the curing reaction can be carried out at room temperature, (18°-25° C) or at elevated temperature (for example 50°-180° C).

The curing can, if desired, also be carried out in two stages, by first prematurely stopping the curing reaction or carrying out the first stage at only moderately elevated temperature, whereby a still fusible and soluble curable precondensate (a so-called "B-stage") is obtained from the epoxide component and the curing agent component. Such a precondensate can, for example, be used for the manufacture of "prepregs", compression moulding compositions or sintering powders.

A further subject of the present invention are therefore curable mixtures which are suitable for the manufacture of mouldings, including sheet-like structures, and which contain the polyepoxide-polysiloxane compounds according to the invention, optionally together with other polyepoxide compounds and also curing agents for epoxide resins, such as polyamines or polycarboxylic acid anhydrides.

The polyepoxide-polysiloxane compounds according to the invention or their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention there may, for example, be mentioned: coal tar, bitumen, glass fibers, boron fibers, carbon fibers, asbestos fibers, natural and synthetic textile fibers, such as polyester fibers, polyamide fibers and polyacrylonitrile fibers; polyethylene powder and polypropylene powder; quartz powder; mineral silicates, such as mica, asbestos powder and slate powder; kaolin, aluminum oxide trihydrate, chalk powder, gypsum, antimony trioxide, bentones, silica aerogel ("AEROSIL"), lithopone; baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycolscan, for example be employed.

As flow control agents when employing the curable mixtures, especially in surface protection, silicones, cellulose acetobutyrate, polyvinylbutyral, waxes, stearates and the like (which in part are also used as mould release agents) may, for example, be added.

Particularly for use in the lacquer field, the polyepoxide compounds according to the invention can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, rolls and the like).

The curablepolyepoxideresin mixtures according to the invention are above all employed in the fields of surface portection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

To determine the mechanical and electrical purposes of the curable mixtures described in the examples which follow, sheets of 92 × 41 × 12 mm were manufactured for determining the flexural strength, deflection, impact strength and water absorption.

The test specimens (60 × 10 × 4 mm) for determining the water absorption and for the flexural test and impact test (VSM* 77,103 and VSM* 77,105 respectively) were machined from the sheets.

*VSM = Verein Schweizerischer Maschinenindustrieller
DIN = Deutsche Industrie-Norm For determining the heat distortion point according to Martens (DIN 53,458) test specimens of size 120 × 15 ×10 mm were cast in each case.

EXAMPLE 1

100 parts by weight of an adduct [manufactured by reaction of 3,300 g of an acid polyester from 11 mols of bacic acid and 10 mols of hexanediol, having an acid equivalent weight of 1,530, with 794 g of 3-(3',4'-epoxycyclohexyl)-8,9-epoxy-2,4-dioxaspiro(5.5)undecane having an epoxide content of 6.8 epoxide equivalents/kg (corresponding to a ratio of 1 equivalent of carboxylic acid of the polyester to 2.5 equivalents of epoxide) for 3 hours at 140° C under a nitrogen atmosphere] having an epoxide content of 0.83 epoxide equivalent/kg are mixed with 20 parts by weight of a methyl-phenylpolysiloxane of average molecular weight 750 which contains 15% of reactive methoxy groups. This product is commercially available under the name Z-6188 (a product of Messrs. DowCorning). 0.1 part by weight of tetramethylammonium chloride is added as the catalyst and this mixture is kept for 4 hours at 140° C whilst stirring and simultaneously distilling off methanol, and then for approximately a further 30 minutes under a vacuum of 20 mm Hg at 90° C.

A resin which is solid at room temperature and has an epoxide content of 0.65 epoxide equivalent/kg is obtained.

EXAMPLE 2

100 parts by weight of an adduct [manufactured by reaction of 3,300 g of an acid polyester from 11 mols of sebacic acid and 10 mols of hexanediol, having an acid equivalent weight of 1,530, with 794 g of 3-(3',4'-epoxycyclohexyl)-8,9-epoxy-2,4-dioxaspiro(5.5) undecane having an epoxide content of 6.8 epoxide equivalents/kg (corresponding to a ratio of 1 equivalent of carboxylic acid of the polyester to 2.5 equivalents of epoxide) for 3 hours at 140° C under a nitrogen atmosphere] having an epoxide content of 0.83 epoxide equivalent/kg are mixed with 30 parts by weight of a methyl-phenylpolysiloxane of average molecular weight 1,200 which contains 11% of reactive methoxy groups. This product is commercially available under the name "Rhodorsil 6,349" (a product of Messrs. Rhone-Poulenc). 0.1 part by weight of tetramethylammonium chloride was added as the catalyst and this mixture was kept for 4 hours at 140° C whilst stirring and simultaneously distilling off methanol, and then for approximately a further 30 minutes under a vacuum of 20 mm Hg at 90° C.

A resin which is solid at room temperature and has an epoxide content of 0.62 epoxide equivalentkg is obtained.

EXAMPLE 3

100 parts by weight of an adduct [manufactured by reaction of 1,080 g of an acid polyester from 11 mols of sebacic acid and 10 mols of neopentyl glycol, having an acid equivalent of 1,080, with 390 g of 3-(3',4'-epoxycyclohexyl)-8,9-epoxy-2,4-dioxaspiro(5.5) undecane, having an epoxide content of 6.4 epoxide equivalents/kg, and 2.94 g of a 6% strength solution of sodium methylate in hexanetriol for 3 hours at 140° C under a nitrogen atmosphere] having an epoxide content of 0.84 epoxide equivalent/kg are mixed with 20 parts by weight of a methyl-phenyl-polysiloxane of average molecular weight 750 which contains 15% of reactive methoxy groups. This product is commercially available under the name Z-6188 (a product of Messrs. Dow-Croning). 0.1 part by weight of tetramethylammonium chloride is added as the catalyst and this mixture is reacted for 4 hours at 140° C whilst stirring and simultaneously distilling off methanol, and whilst passing nitrogen over the mixture. Thereafter the mixture is additionally kept for about 30 minutes under a vacuum of 20 mm Hg at 90° C.

A resin which is highly viscous at room temperature and has an epoxide content of 0.7 epoxide equivalent/kg is obtained.

USE EXAMPLES 1. 100 parts by weight of the resin described in manufacturing example 1 are mixed with 10 parts by weight of hexahydrophthalic anhydride and 1 part by weight of a soltuion of 0.82 part of sodium in 100 parts of 2,4-dioxy-3-methylolpentane at 120° C and the mixture is poured into an aluminium mould warmed to 120° C and cured for 16 hours at this temperature. The castings obtained have the following properties:

Tensile strength (kp/mm$^2$): 0.5
Elongation at break [%]: 200
Water absorption after 20 days at room temperature [%]: 0.6
Water absorption after 1 hour at 100° C [%]: 0.7

For comparison, 100 parts by weight of the adduct described in manufacturing example 1 which has not yet been reacted with the methyl-phenylsiloxane are mixed with 12 parts by weight of hyxahydrophthalic anhydride and 3 parts be weight of a solution of 0.82 part of sodium in 100 parts of 2,4-dihydroxy-3-methylolpentane at 120° C and the mixture is poured into an aluminium mould warmed to 120° C. Curing was carried out for 16 hours at this temperature. The castings obtained have the following properties:

Tensile strength (kp/mm$^2$): 1.5
Elongation at break [%]: 200
Water absorption after 20 days at room temperature [%]: 2.0
Water absorption after 1 hour at 100° C [%]: 1.1

2. 100 parts by weight of the resin described in manufacturing example 2 are mixed with 10 parts by weight of hexahydrophthalic anhydride and 1 part by weight of a solution of 0.82 part of sodium in 100 parts of 2,4-dihydroxy-3-methylolpentane at 120° C and the mixture is poured into an aluminium mould warmed to 120° C and cured for 16 hours at this temperature. The castings obtained have the following properties:

Tensile strength (kp/mm$^2$) : 0.5
Elongation at break [%]: 160
Water absorption after 20 days at room temperature [%]: 0.55
Water absorption after 1 hour at 100° C [%]: 0.52

3. 100 parts by weight of the resin described in manufacturing example 3 are mixed with 10 parts by weight of hexahydrophthalic anhydride and 1 part by weight of a solution of 0.82 part of sodium in 100 parts of 2,4-dihydroxy-3-methylolpentane at 120° C and the mixture is poured into an aluminium mould warmed to 120° C and is cured for 16 hours at this temperature. The castings obtained have the following properties:

Tensile strength (kp/mm$^2$) : 0.12
Elongation at break [%]: 110
Water absorption after 20 days at room temperature [%]: 0.65
Water absorption after 1 hour at 100° C [%]: 0.72

We claim:
1. Polyepoxide-polysiloxanes characterised in that they contain units of the formula I

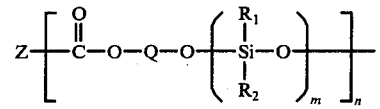

in which Z denotes a n-valent radical of a polycarboxylic acid or of an acid polyester, Q denotes an aliphatic, cycloaliphatic, heterocyclic or aromatic epoxide-containing group in which the two oxygen atoms bonded to Q in the formula I are in adjacent positions to one another, $R_1$ and $R_2$ independently of one another denote an alkyl, alkenyl, aralkyl, aryl, cycloalkyl, alkoxy or aryloxy group or an epoxide-containing polysiloxane chain, $m$ denotes a number greater than 1 and $n$ denotes 2 or 3.

2. Polyepoxide-polysiloxane compounds according to Claim 1, characterised in that n in the formula I denotes 2 and that the polyepoxide-polysiloxane compounds possess recurring units of the formula II

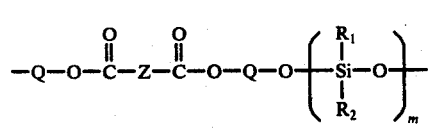

3. Polyepoxide-polysiloxane compounds according to claim 2, characterised in that Z dentoes the radical of a polyester from an aliphatic or cycloaliphatic dicarboxylic acid and a diol.

4. Polyepoxide-polysiloxane compounds according to claim 3, characterised in that Z represents the radical of an aliphatic polyester with at least 8 carbon atoms in the recurring structural unit, and having a melting point of 50° to 140° C.

5. Polyepoxide-polysiloxane compounds according to claim 4, characterised in that Z denotes the radical of a polyester from $x$ mols of a dicarboxylic acid and (x-1) mols of a diol, with $x$ representing a number from 2 to 50.

6. Polyepoxide-polysiloxane compounds according to one of claims 1, characterised in the $R_1$ and $R_2$ in the formula I independently of one another denote an alkyl or alkoxy group with 1 to 4 carbon atoms, an aralkyl group with 7 to 10 carbon atoms, a phenyl group, a phenoxy group or a cyclohexyl group.

7. Polyepoxide-polysiloxane compounds according to one of claims 1, characterised in that m in the formula I represents a number from 2 to 30, preferably 6 to 15.

8. Polyepoxide-polysiloxane compounds according to one of claims 1, characterised in that Q in the formula I represents a cycloaliphatic group possessing an epoxide group.

9. Polyepoxide-polysiloxane compounds according to claim 8, characterised in that Q represents the 3-(3′,4′-epoxycyclohexyl)-2,4-dioxaspiro(5.5)undecylene-(8,9) radical.

10. Curable mixtures which are suitable for the manufacture of mouldings or coatings, characterised in that they contain a) polyepoxide-polysiloxanes according to claims 1 and b) curing agents for epoxide resins, such as polyamines or polycarboxylic acid anhydrides.

* * * * *